United States Patent [19]

Vincent et al.

[11] 3,861,435

[45] Jan. 21, 1975

[54] WHEELS

[75] Inventors: Frederick Reginald Vincent, Cannan; Brian Auty, Bath, both of England

[73] Assignee: Bath Institute of Medical Engineering, Somerset, England

[22] Filed: Feb. 13, 1973

[21] Appl. No.: 332,219

[30] Foreign Application Priority Data
Feb. 16, 1972  Great Britain...................... 7289/72

[52] U.S. Cl.......................................... 152/5, 180/7
[51] Int. Cl............................................. B60b 3/00
[58] Field of Search ................... 152/5, 7, 19; 180/7

[56] References Cited
UNITED STATES PATENTS

| | | | |
|---|---|---|---|
| 2,073,347 | 3/1937 | Leathers................. | 152/7 |
| 3,212,594 | 10/1965 | Scott....................... | 180/7 |
| 3,698,461 | 10/1972 | Markow.................. | 152/5 |

*Primary Examiner*—Philip Goodman
*Attorney, Agent, or Firm*—Kenway & Jenney

[57] ABSTRACT

A wheel comprising a hub and a dished outer member of flexible, elastomeric material such that under an increased load the dished outer member deflects to increase the area of the surface of the member in contact with the ground.

10 Claims, 11 Drawing Figures

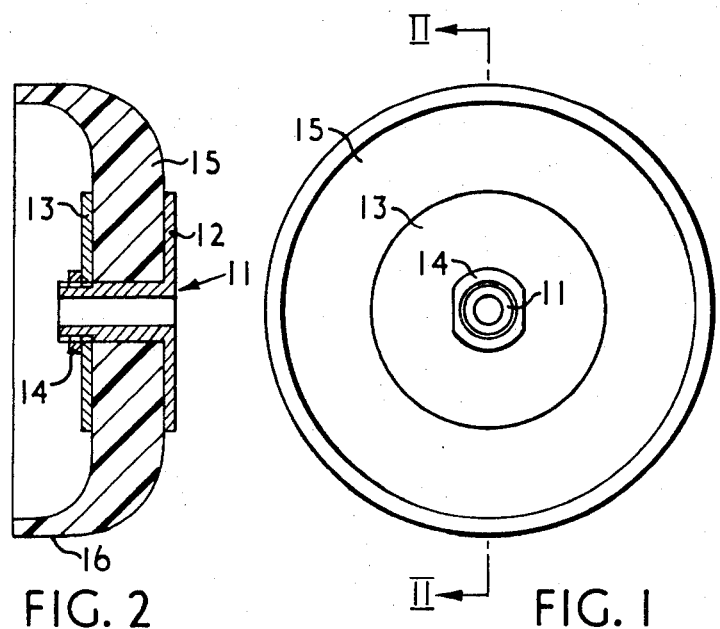
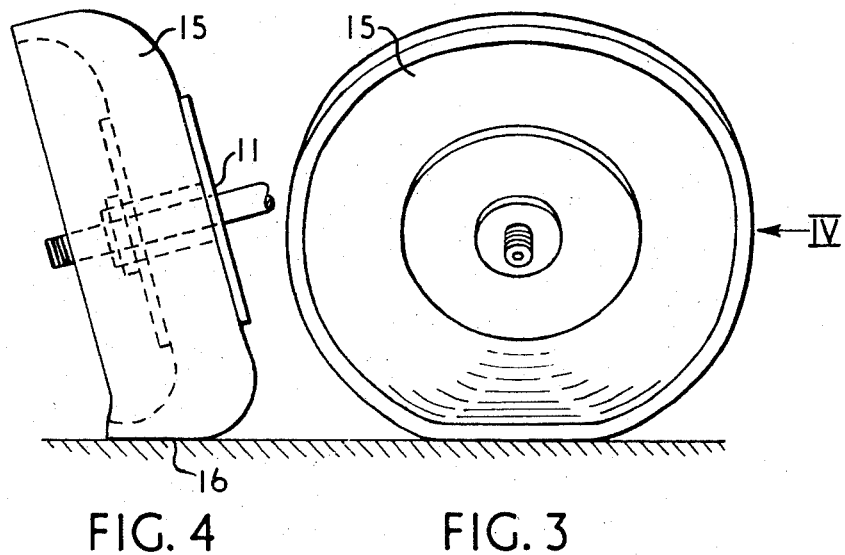

WHEELS

The invention relates to wheels and wheeled vehicles.

A problem which arises when a wheeled vehicle or carriage has to traverse soft terrain such as sand, shingle, soft mud or marshy ground is that its wheels tend to sink into the soft terrain, making it difficult or impossible for the vehicle or the carriage to be propelled across such terrain. One particular example of this problem, with which the invention is particularly but not exclusively concerned, is encountered in the case of a pushchair for handicapped or injured children which is to be used on a beach, muddy path or other soft terrain likely to be encountered perhaps on special occasions for example when the children are on holidy near the sea.

It is known to overcome the problem of wheels sinking into soft terrain either by using tracks in place of wheels, or by using very wide wheels which offer a large area of contact with the ground. Both of these solutions can be cumbersome and expensive and it is an object of the invention to provide an alternative.

In accordance with one aspect of the present invention there is provided a wheel comprising a hub and a dished outer member of flexible, elastomeric material such that under an increased load the dished outer member deflects to increase the area of the surface of the member in contact with the ground.

An outermost portion of the surface of the dished outer member of the wheel when undeflected may be cylindrical or it may be of frusto-conical shape. This portion of the surface being that which engages the ground.

In accordance with another aspect of the present invention there is provided a vehicle or carriage incorporating a wheel or a series of wheels according to the preceding aspect of the invention. The wheel may be mounted on an axle of the vehicle for rotation about an axis which, when the vehicle is horizontal, is horizontal or for rotation about an axis which is inclined relative to the horizontal so that the concave dished part of the wheel faces in a downwardly inclined direction. Furthermore, the angle of inclination of the axis about which the wheel is mounted for rotation could be adjustable relative to the vehicle to enable an angle of inclination for the axis to be selected which will give the best performance in terms of the ease of mobility of the wheel, over a particular type of terrain.

The deformation of the wheel while giving advantages when used on soft ground is found to be disadvantageous when the wheel is used on hard ground, because the increased area of contact achieved by the wheel deformation increases the rolling resistance of the wheel.

To overcome or reduce this disadvantage the vehicle may include means capable of restraining deflection of the dished outer member so that under an increased load the dished member is restrained from deflecting to increase the area of the surface of the member in contact with the ground.

In a preferred embodiment for overcoming this disadvantage a small roller is rotatably mounted at one end of an arm mounted for pivoting about the axis of rotation of the wheel but securable in a position in which the axis of the roller is vertically below the axis of rotation of the wheel. The roller is arranged so that it is in contact with the inner surface of the ground engaging portion of the wheel when the wheel is in undeflected condition. When the wheel is to be used over hard ground the roller is secured with its axis vertically below the axis of rotation of the wheel and prevents or at least restricts deflection of the wheel and thus decreases the normal rolling resistance of the wheel in use. When the wheel is to be used over soft ground the arm is freed to allow it to pivot about the wheel axis so that deflection of the wheel is permitted, the deflected part of the wheel automatically moves the roller to a position where it does not interfere with the deflection of the wheel.

The disadvantage can also be overcome or reduced in an alternative type of construction in which a second wheel of conventional construction and thus not as set forth in claim 1 is disposed at the axle upon which the wheel of the invention is mounted and is arranged to be movable relative to the of the present invention to a ground engaging position in which it supports or substantially supports the load on that axle but is movable to an out-of-use position whereby the wheel of the invention supports the load on that axle.

In one such construction the second wheel is mounted co-axially with the wheel of the invention, the arrangement being such that the selection of which one of the two wheels at that axle is to be arranged to support the load is effected by adjustment of the angle of inclination of the axis.

In a further construction of this alternative type for overcoming the disadvantages discussed above, the wheel of the invention is mounted for rotation about an axis the inclination of which relative to the horizontal is adjustable as has been described earlier in this specification. A second wheel of conventional construction is mounted co-axially adjacent the wheel of the present invention and is of a diameter such that when the axis of rotation of both wheels is horizontal it is the conventional wheel which is in contact with the ground not the wheel in accordance with the present invention. When the axis of rotation of the wheels is inclined for example, an angle of 7½°–15° is envisaged, it is the wheel in accordance with the present invention which is in contact with the ground while the conventional wheel is raised out of contact with the ground. In this type of construction the selection of which of the two wheels is to be arranged to support the load at that axle is effected by adjustment of the angle of inclination of the axles.

In yet a further manner of overcoming or reducing the disadvantage instead of a conventional wheel being included the inclination of the axis of the wheel of the present invention could be adjustable through say 10° from the horizontal, so that the dished part of the wheel faces upwardly and it is the relatively undeflectable inner part of the wheel which contacts the ground, the dished part being clear of the ground.

Embodiments of the invention will now be described by way of example only, with reference to the accompanying drawings in which:

FIG. 1 is a side elevation of a wheel according to the present invention;

FIG. 2 is a section on the line II—II of FIG. 1;

FIG. 3 is a diagrammatic side elevation of the wheel when installed on a vehicle and in contact with the ground;

FIG. 4 is a view on arrow IV on FIG. 3;

Figure 10:
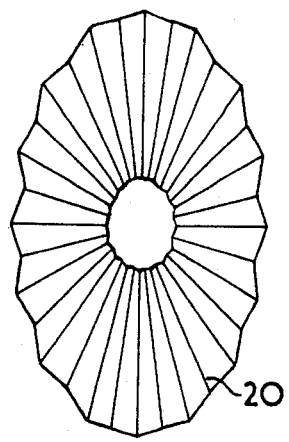
Figure 8:
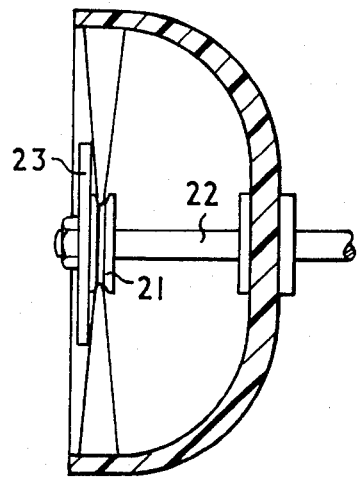
Figure 11:
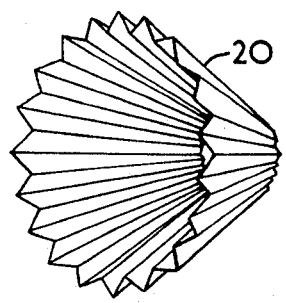
Figure 9:
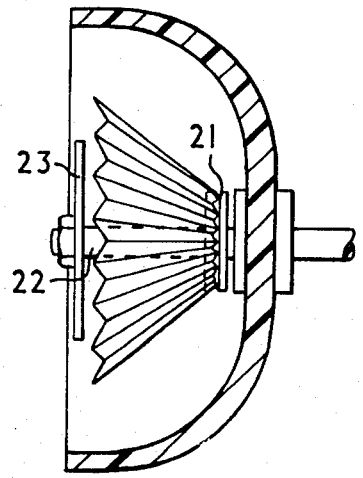

FIGS. 8 and 9 are sectional side elevations of a wheel as shown in FIG. 1 but with a different modification; and FIGS. 10 and 11 are perspective views of a detail shown in FIGS. 8 and 9.

As shown in FIG. 2 the wheel comprises a rigid hub 11 with an integral flange 12 and a second flange 13 held in position by a nut or circlip or similar restraining device 14. The hub as a whole, including the flange 13, is constituted from a substantially rigid material such as metal or a tough rigid plastics material.

A dished outer member 15 of flexible elastomeric material is mounted on the hub between the flanges 12 and 13. The flanges 12 and 13 offer support for the inner part of the outer member 15, but the outer member 15 extends a substantial distance beyond these flanges and is free to deflect near its outer periphery. The outer member 15 is tapered in thickness towards its outer periphery and also is dished as shown most clearly in FIG. 2 wherein it can also be seen that when undeflected a portion of the convex surface of the dished outer member is elliptical in shape. FIGS. 1 and 2 also show that an outermost portion 16 of the convex surface of the member 15 is cylindrical and thus that portion 16 which engages the ground is substantially linear in a plane containing the axis of the wheel.

In use, the wheel as shown in FIGS. 1 and 2 is mounted on a vehicle for rotation on an axle which is inclined at an angle of the order of 7½° to 15° to the horizontal when the vehicle is horizontal. The arrangement of the wheel on the axle is such that the concave side of the wheel is facing downwards. As shown in FIGS. 3 and 4 when the wheel is engaging the ground and the axle is loaded the member 15 of the wheel deflects in the vicinity of its ground engaging portion 16 so that a substantial area of the wheel in both width across the wheel as shown in FIG. 4, and length in the direction of travel of the wheel as shown in FIG. 3, is in contact with the ground. If the load on the wheel is increased beyond that which causes the deflection as shown in FIGS. 3 and 4, then a further deflection of the ground engaging part of the member 15 of the wheel takes place with the result that both the length and width of the area in contact with the ground increases. Thus, although there is a substantial area in contact with the ground when the vehicle or carriage is lightly loaded, this area increases further with increasing load.

A wheel as described above gives a relatively large area of contact with the ground for a very simple wheel, and thus it is particularly suitable for products such as pushchairs which are likely to be pushed over sand or other soft terrain. The fact that the area of contact of the wheel with the ground increases as load on the wheel is increased results in a capacity for a pushchair to carry a relatively heavy child or a relatively light one over soft terrain with substantially the same order of resistance to the wheel sinking.

The material of the dished outer member may be natural rubber or a suitable plastics material. The basic requirements of the material are that it should have a suitable shore hardness to result in a suitable degree of deflection under a typical load, and that it should be sufficiently tough to withstand a degree of abrasion from contact with the ground.

Owing to the relatively large area of contact with the ground when a carriage or vehicle, supported on wheels such as described above, is moved over soft terrain, the wheels sink into the soft terrain to only a very limited extent, which enables the carriage or vehicle to traverse this soft terrain much more easily than a narrow wheeled vehicle.

Figures 5, 6:
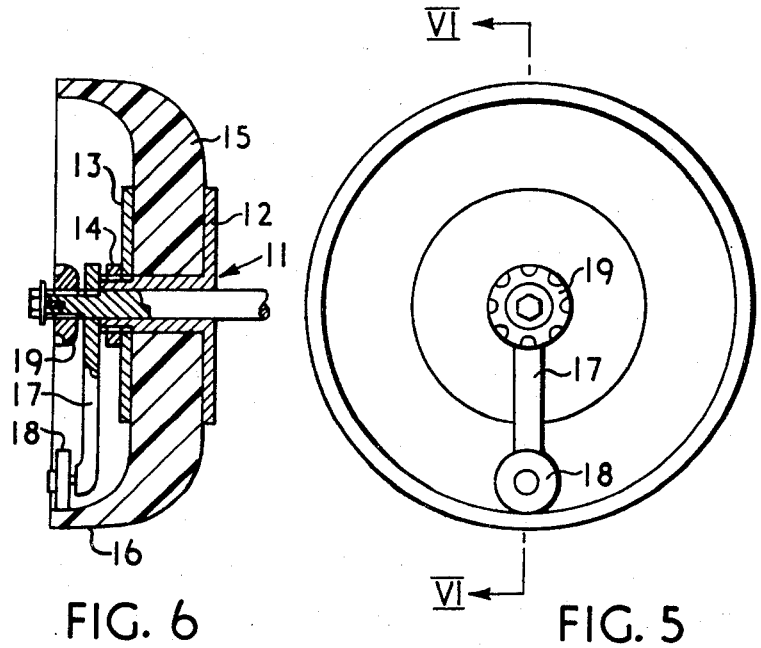
FIG. 5 is a side elevation of a wheel according to the present invention as shown in FIG. 1, but with a modification.
FIG. 6 is a section on the line VI—VI of FIG. 5.
Figure 7:
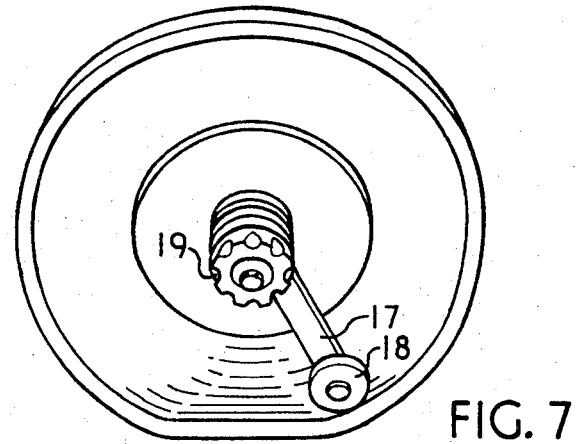
FIG. 7 is a similar elevation to that of FIG. 3, but of the wheel modified as shown in FIGS. 5 and 6.

It has been found that, in practice, the constructions so far described have a disadvantage in that when the wheel is used on hard ground, due to the relatively large area of contact between the wheel and the ground rolling resistance greatly exceeds that which would be encountered with a normal wheel. However, the construction can be modified as shown in FIGS. 5, 6 and 7 so that the rolling resistance on hard ground can be reduced to a value equal or comparable with that of a conventional wheel.

An arm 17 is pivotally mounted at its one end on the axle about which the wheel is rotatable. At its other end the arm 17 carries a roller 18 rotatably mounted on the arm 17. The arm 17 is free to rotate about the axle but can be secured in a position in which the axis of rotation of the roller 18 is vertically below the axis of the axle. The means for securing the arm in that position can be of any conventional type, one of which is illustrated in the accompanying drawings and includes a hub cap 19 formed with finger grooves and arranged to be screwed along the axle to force the arm into engagement with a key or the like carried by the axle.

The roller 18 is arranged so that it is in contact with the inner surface of the ground engaging portion 16 of the outer member 15 of the wheel when it is undeflected. When the wheel is to traverse hard ground the arm is secured in the position in which the axis of the roller is vertically below the axis of the axle and so prevents or at least restricts the deflection of the ground engaging portions 16 of the wheel. When the wheel is to traverse soft ground the arm is freed by release of the hub cap 19 to enable it to pivot to a position in which the roller 18 does not restrict deflection. As shown in FIG. 7 the part of the member 15 of the wheel which deflects moves the roller 18 to one side as it deflects.

In a further modification, not illustrated, in which deflection of the ground engaging portion of the member 15 of the wheel is retrained or prevented, a disc is secured in the concave part of the wheel with its periphery engaging the inner surface of the ground engaging portion 16 of the outer member 15 of the wheel. Securing means for holding the disc in place is of a type enabling the disc to be mounted and removed with ease.

FIGS. 8 to 11 illustrate a modification the operation of which is similar to the disc described in the preceding paragraph. The modification includes the addition of a disc member 20 which by the provision of radial fold lines can be considered as being made up from a plurality of parts connected together. The connection together of these parts is such as to enable the member 20 to be changed in configuration from that shown in FIG. 10, that of a disc, wherein the parts are unfolded, to that shown in FIG. 11 wherein the member is folded or collapsed and in a configuration approaching that of a cylinder. The disc member 20 may be made of metal or any other suitable material, but a plastics material is preferred of the type allowing the hinges at the fold lines to be formed by a reduction in thickness of the material in the well-known way to form "plastic hinges." As shown in FIGS. 8 and 9 the disc member 20 is carried on a bobbin 21 slidably mounted on an axle 22 upon which the hub 11 of the wheel is mounted. At its outer end the axle 22 carries a restraining disc 23. Means is provided for moving the bobbin 21 along the axle and securing it in either of the positions shown in FIGS. 8 and 9.

In operation, when the ground to be traversed is soft the bobbin 21 is in the position shown in FIG. 9 and the disc member 20 is in its collapsed condition. When the ground to be traversed is hard the bobbin 21 is moved along the axle 22 towards the position shown in FIG. 8. During this movement the folds of the disc member 20 engage the periphery of the disc 23 so that the disc member 20 is expanded. The dimensions of the parts are such that when the bobbin 21 is against the disc 23 the disc member 20 is fully expanded to the position shown in FIG. 8 in which its periphery engages with the inner surface of the ground engaging portion 16 of the outer member 15 of the wheel and prevents its deflection.

Wheels in accordance with the present invention behave in the manner of a conventional wheel when deflection of the wheel is prevented or restrained. However, when such restraint or prevention is absent, the wheel rotates but it also deforms in contact with the ground's surface to form a wave figure of contact. When negotiating a depression in the ground's surface it climbs out of the depression rather than rolls out of it and it grips in the manner of a endless track as opposed to rolling in the manner of a conventional wheel. When a conventional wheel is used on soft ground it tends to build up a barrier ahead of it and has to push its way through that barrier for further movement, thus tending to build up an even larger barrier. The wheel of the present invention with its wave motion characteristic tends to climb out and over any barrier it encounters and does not build up a barrier. Furthermore, the wheel of the present invention when encountering a barrier is able to deflect so that it will move to one side of the barrier or push the barrier to one side.

Wheels in accordance with the present invention may be formed or provided with a tread, particularly when the wheel is to transmit power. The treads may have any of the patterns commonly found on car tyres or, alternatively, can have the tread pattern similar to that of a tractor drive wheel in which the ridges of the tread are parallel to the axis about which the wheel rotates.

We claim:

1. A wheel comprising a hub and an outer ground engaging member, said outer member being of a generally dish shape, tapered in thickness towards its outer periphery and formed from a flexible elastomeric material, the cross-sectional shape of the outermost surface of said outer member being elliptical, whereby said outer member is capable of deflecting to increase the area of surface contact between said outer member and the ground in response to an increase of load upon said wheel.

2. A vehicle including said wheel set forth in claim 1 and including an axle at which said wheel is mounted for rotation about its axis and for supporting a load on said axle.

3. A vehicle as claimed in claim 2 wherein said axis is inclined relative to the horizontal when said vehicle is disposed horizontally, the concave surface of said outer member facing downwards.

4. A vehicle as claimed in claim 2 and including means for adjusting the inclination of said axis relative to said vehicle.

5. A vehicle as claimed in claim 2 and including a second wheel of conventional construction, said second wheel being mounted at said axle upon which said wheel of the invention is mounted, said second wheel being arranged to be movable relative to said wheel of the invention to a ground engaging position in which it supports or substantially supports the load on said axle but is movable to an out-of-use position whereby said wheel of the invention supports the load on said axle.

6. A vehicle as claimed in claim 5 and including means for adjusting the inclination of said axis relative to said vehicle, said second wheel being mounted coaxially with said wheel of the invention whereby the selection of which one of said two wheels at said axle is to be arranged to support the load is effected by adjustment of the angle of inclination of said axis.

7. A vehicle as claimed in claim 2 and including means capable of restraining deflection of said outer member whereby under an increased load said outer member is restrained from deflecting to increase the area of surface contact between said outer member and the ground.

8. A vehicle as claimed in claim 7 wherein said means comprises an arm mounted for pivoting about said axis of said wheel, a roller rotatably mounted at an end of said arm, and means operable to secure said arm in a position in which the axis of said roller is vertically below said axis of said wheel and said roller is in contact with the inner surface of that portion of said outer member which contacts the ground and restrains that portion from movement from its undeflected position.

9. A vehicle as claimed in claim 7 wherein said means comprises a disc member securable in the concave part of said outer member of said wheel, the periphery of said disc member engaging the inner surface of said outer member to restrain said outer member from deflection.

10. A vehicle as claimed in claim 9 wherein said disc member comprises a plurality of parts connected together in a manner enabling the configuration of said disc member to be changed from that of a disc towards that of a cylinder, means being provided to effecte the change in configuration of said disc member to its disc shaped configuration and for retaining said disc member in that configuration.

* * * * *